Figure 1:
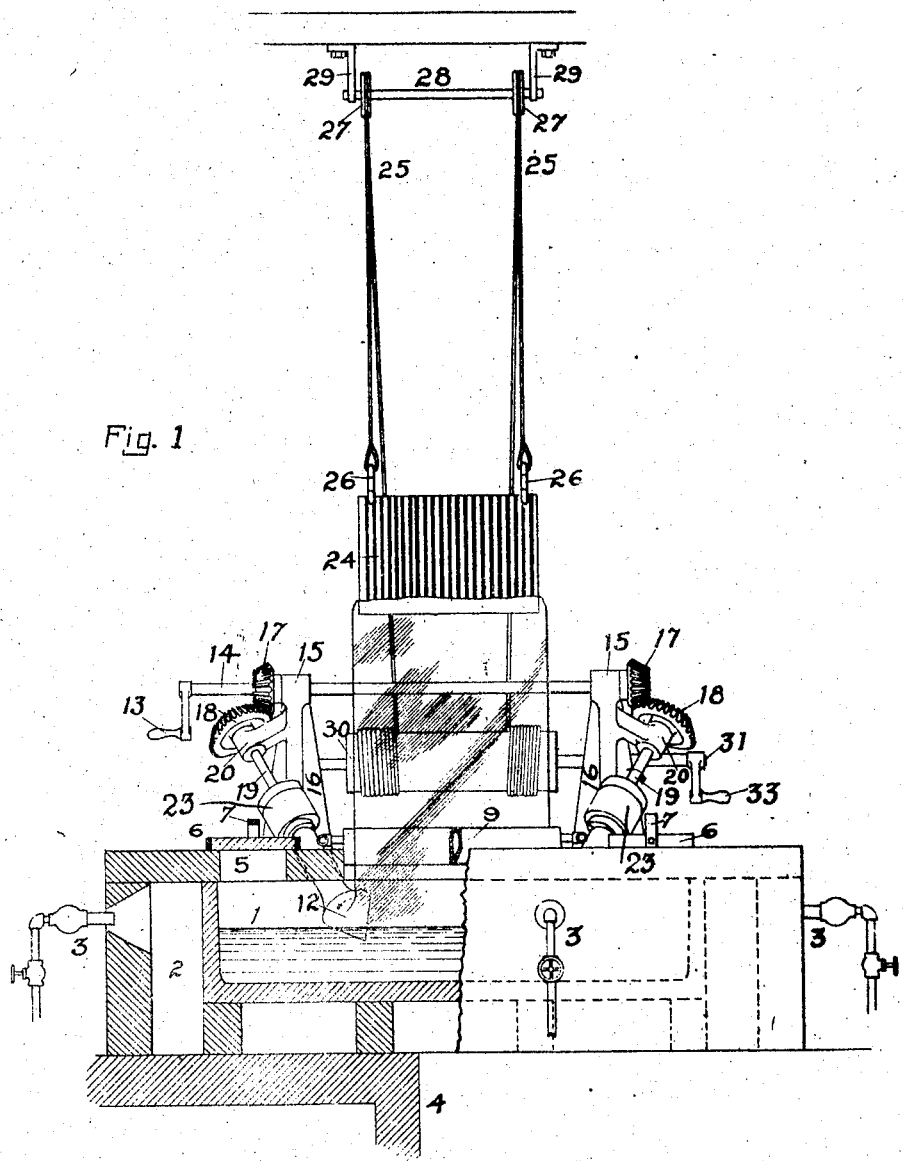

No. 823,581. PATENTED JUNE 19, 1906.
I. W. COLBURN & E. WASHBURN.
APPARATUS FOR DRAWING SHEET GLASS.
APPLICATION FILED MAY 20, 1904. RENEWED DEC. 24, 1904.

3 SHEETS—SHEET 1.

WITNESSES

INVENTORS

ATTORNEYS

No. 823,581. PATENTED JUNE 19, 1906.
I. W. COLBURN & E. WASHBURN.
APPARATUS FOR DRAWING SHEET GLASS.
APPLICATION FILED MAY 20, 1904. RENEWED DEC. 24, 1904.

3 SHEETS—SHEET 2.

WITNESSES
INVENTORS
ATTORNEYS

UNITED STATES PATENT OFFICE.

IRVING W. COLBURN AND EDGAR WASHBURN, OF FRANKLIN, PENNSYLVANIA; SAID WASHBURN ASSIGNOR TO SAID COLBURN.

APPARATUS FOR DRAWING SHEET-GLASS.

No. 823,581. Specification of Letters Patent. Patented June 19, 1906.

Application filed May 20, 1904. Renewed December 24, 1904. Serial No. 238,222.

*To all whom it may concern:*

Be it known that we, IRVING W. COLBURN and EDGAR WASHBURN, of Franklin, Pennsylvania, have invented a new and useful Apparatus for Drawing Sheet-Glass, which invention is fully set forth in the following specification.

This invention relates to the art of glass-working, and more particularly to the art of drawing sheets of glass from a mass of molten metal. Heretofore many efforts have been made to draw a sheet of glass from a molten mass by a direct drawing action, and one of the great difficulties to overcome when sheets are to be thus drawn is due to the tendency of the sheet of glass to draw to a narrow rod or thread, or in any event the tendency of the glass is to very much narrow, so that a sheet of regular width and thickness is not produced.

In the application of Irving W. Colburn, Serial No. 178,912, filed October 28, 1903, there is shown and described an apparatus for drawing a sheet of glass, which sheet after it is drawn by the bait from the mass of molten metal is stretched sidewise by a series of rollers operating upon the opposite sides of the glass for that purpose.

The object of the present invention is to provide a simplified form of apparatus for drawing the sheet-glass of a uniform width and thickness without the necessity of subjecting the glass to the action of the side-stretching rollers after the sheet has been drawn from the mass of molten metal.

With this object in view the invention consists first in means for drawing the molten glass in sheet form from a working pot containing a mass of molten glass, which means act in the direction of the sheet's length, combined with means for simultaneously drawing the glass laterally and stretching the sheet laterally as it emerges from the molten mass. Preferably the last-mentioned means operates not only to draw and stretch the glass laterally, but also to at the same time impart an upward movement to the molten mass, so that the action of the side drawing and stretching means is outward and upward at an acute angle to the surface of the molten glass in the working pot.

For the purpose of enabling the workmen to manipulate the glass so as to get the desired thickness under the various working conditions of the molten mass in the working-pot the bait which operates to draw the glass upward is provided with operating means which will enable the workman to impart various speeds thereto, and the lateral drawing and stretching device is also provided with means for driving it at various speeds. The means for operating the bait in its upward movement and the lateral drawing and stretching device may be either manually operated or may be driven by power and provided with means for varying the speed at which the devices mentioned are actuated by the power. For the purpose of illustrating the principle of the invention there are herein shown manually-operated devices for actuating the bait and side drawing and stretching means. The glass having been drawn and stretched to the desired width immediately adjacent to the surface of the molten glass in the working pot, it is desirable in order to maintain the sheet of even width and thickness that it should be immediately thereafter so set or cooled that it will not continue to change its form under the drawing action of the bait, and for this purpose the sheet immediately after it is drawn and side-stretched is cooled, preferably by means of a circulating medium, as water, confined in suitable cooling-boxes adjacent to the opposite sides of the drawn sheet and near the surface of the molten mass in the working pot. It is important, however, that the glass, while cooled so as to be of sufficient consistency to resist drawing action, should nevertheless be warm enough to avoid cracking or checking during the drawing operation, and for the purpose of correcting any excessive cooling that may occur while passing the cooling apparatus means are provided by the present invention for sufficiently heating the surfaces of the drawn sheet to avoid cracking or checking under the drawing action. Any suitable means for imparting the heat to the surface of the drawn sheet may be employed.

For the purpose of illustrating the invention there is herein shown a set of gas-jets whose flame is directed upon the opposite surfaces of the drawn sheet, though other devices which will suggest themselves to one skilled in the art may be employed.

In order that the glass may not crack from the bait during the drawing operation, it is desirable that the bait should be of such character as to yield, so as to compensate for the contraction of the glass as it cools at the points where it is attached to the bait. For the purpose of thus permitting the bait to yield or contract with the contraction of the glass the present invention provides a corrugated metallic bait whose corrugations will permit the bait to yield sufficiently for the purpose mentioned.

It will be apparent to those skilled in the art that the inventive ideas constituting the invention may receive various mechanical expressions without in any way departing from the spirit of the invention. For the purpose of illustrating and describing the invention one of the mechanical expressions which the invention may receive is illustrated in the accompanying drawings, in which—

Figure 2:
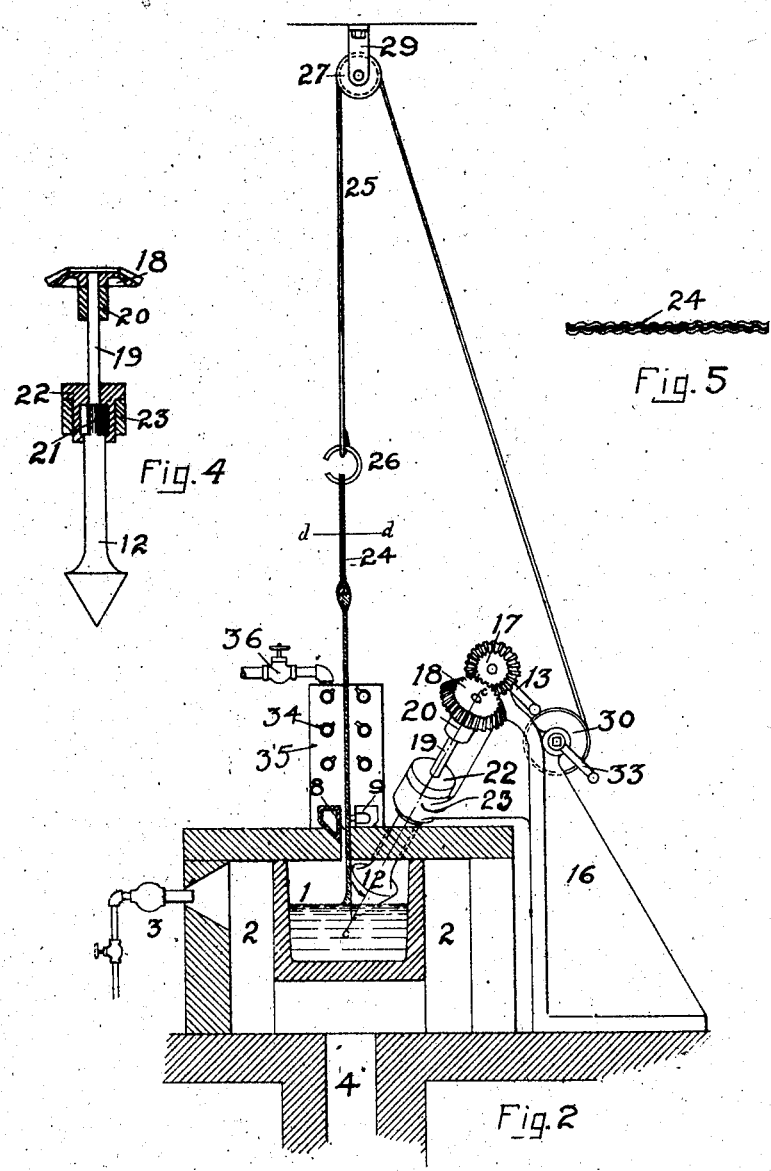
Figure 3:
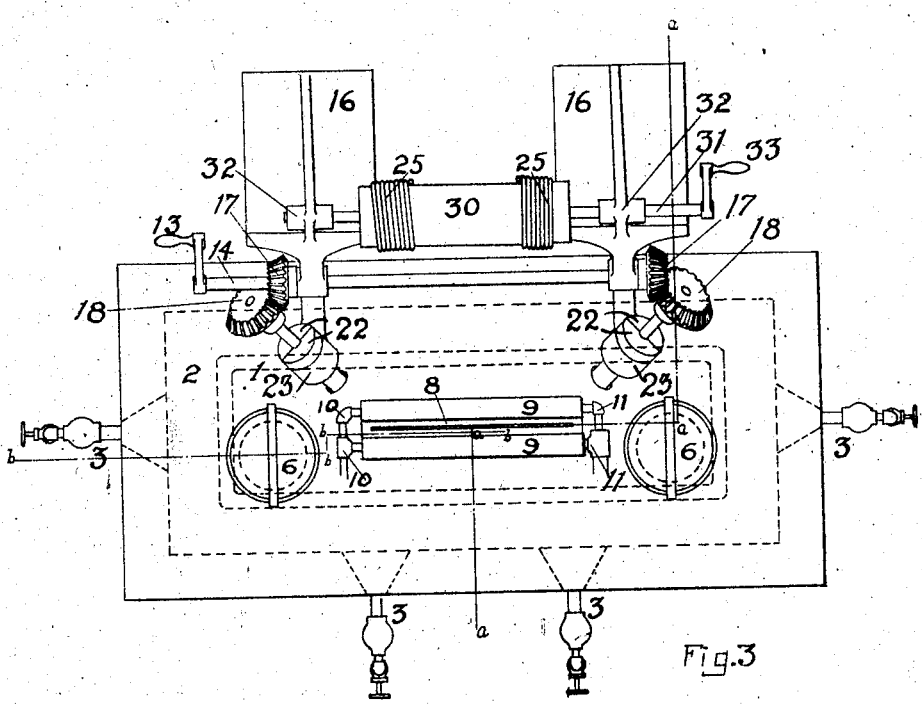

Figure 1 is a front elevation of the machine, the left-hand lower portion thereof being shown in section taken on line *b b b b*, Fig. 3. Fig. 2 is a side elevation with a portion of the machine shown in section, the section being taken on the line *a a a a*, Fig. 3. Fig. 3 is a top plan of the machine. Fig. 4 is a section taken on the line *c c*, Fig. 2, and showing the means for uniting the driving-gears to the beveled stretching-rollers; and Fig. 5 is a cross-sectional view of the bait, taken on the line *d d*, Fig. 2.

Referring to the drawings, in which like numerals refer to like parts, 1 is a working-pot of any suitable construction for containing the mass of molten glass, and 2 is the fire-box surrounding said pot, heat being supplied to said fire-box in any suitable manner, as by burners 3 3, the products of combustion being carried off by a suitable flue 4. The molten mass is supplied to the working pot 1 from a ladle or punty through an opening or openings 5, which openings are closed after the glass has been poured into the working pot by means of lids or covers, these being provided with bails or handles 7 to facilitate their removal and replacement in position. The upper part of the working pot 1 and the fire-box or heating-chamber 2 may be entirely closed during the drawing operation and a long narrow slot 8 provided in the top of the fire-box through which the bait is inserted and the sheet of glass withdrawn.

For the purpose of setting or cooling the glass immediately after it has been drawn and stretched to the desired width suitable cooling apparatus is provided. That herein shown consists of two closed boxes 9 9, situated on opposite sides of the working slot 8, said boxes being provided with means for circulating a cooling medium, as water, therethrough, the inlet for said means being pipes 10 10 and the outlet-pipes 11 11, as clearly shown in Fig. 3.

The tendency of the glass when a sheet is attempted to be drawn from a mass of molten metal is for the sheet to gradually narrow and eventually pull to a rod or thread, and in the present invention we have provided means for continuously overcoming this narrowing tendency of the sheet during the drawing operation. As herein illustrated, these means consist of conical rollers 12 12, situated adjacent to one face of the sheet as it is being drawn, one roller being near each edge of the sheet. These rollers 12 are mounted so that the apexes of the cone-shaped rollers are dipped in the surface of the molten glass of the working pot 1 and are each geared to a revolving shaft 14, turning in bearings 15 on supports 16, resting on the main framework of the apparatus, the rollers being driven by a crank 13, connected to the shaft 14, and a set of bevel-gears 17 and 18, one upon the shaft 14 and the other upon the shaft 19 of the conical roller 12. The angle at which the shaft is inclined to the surface of the sheet-glass being drawn and to the surface of the molten glass in the working pot may be varied somewhat; but it has been found that a very advantageous angle to employ is one of about thirty degrees inclination both to the surface of the sheet and to the surface of the molten glass of the working pot. Preferably the rollers 12 are not integrally formed with the driving-shafts 19 therefor, but are separately connected thereto. This may be accomplished in any suitable manner, and, as herein shown, this is done by providing the roller with a polygonal head 21, engaged in a split or divided socket 22, keyed to the shaft 19, the said split socket 22 having a downwardly-projecting part which takes into the interior of the bearings 23, and an enlarged head which bears upon the sides of said bearings, thereby affording a bearing for the revolution of the roller and at the same time determining its immersion in the mass of molten glass in the working pot 1. The bevel-gears 17 and 18 are so mounted and constructed that the two conical rollers driven thereby shall revolve one with the hands of the clock and the other in the reverse direction, the direction of movement of each roller being upward toward the bait and outward toward the edge of the sheet being drawn, as is clearly indicated by the arrows in Figs. 1 and 2.

The bait 24 is composed of sheet metal of suitable thickness, which is corrugated after the manner clearly shown in Fig. 5. This bait is hung to suitable drawing-cables 25 by suitable attaching devices, as open rings 26, and the cables are passed over sheaves 27, turning on shaft 28, supported in overhead bearings 29. After passing over the sheaves 27 the cables are wound around the drum 30, carried on shaft 31, turning in suitable bearings 32 and driven by the drum-crank 33.

For the purpose of supplying the desired amount of heat to the surface of the sheet-glass during the drawing operation and after it has passed between the cooling-boxes 9 9 there is provided a set of burners 34, (shown in Fig. 2,) mounted upon a suitable frame 34 and supplied by a suitable conduit controlled by valve 36, whereby the amount of fuel supplied to the jets, and hence the amount of heat supplied to the sheet of glass, may be controlled.

Operation: The molten glass of the working pot 1 having been brought to the proper heat and working condition and the corrugated bait 24 being previously heated or treated, so that the plastic glass will adhere thereto, the same is lowered into the mass of molten glass and allowed to stand until the plastic glass has firmly adhered thereto. A cooling medium, as water, is allowed to circulate through the cooling-boxes 9 9 and the burners 34 are lighted. After the glass has adhered firmly to the bait the same is started upward by the workman turning the crank 33, and when the bait is raised to a sufficient height to allow the sheet to come into contact with the conical drawing and stretching rollers 12 12 the rollers are started to revolving in opposite directions—that is, each in an upward direction, but each one then turning out toward one edge of the sheet of glass, as shown by the arrows in Figs. 1 and 2. These rollers will act to draw molten glass from the working pot to form the lateral portions of the sheet and also to stretch the sheet of glass laterally, and thus prevent it from narrowing or drawing to a string or thread, as it would otherwise do.

It has been found that the lateral stretching action should be applied with a force substantially equal to the force applied for drawing the sheet-glass upward. This may be varied somewhat within narrow limits, depending upon the working condition of the glass being treated and the character of the sheet being drawn; but approximately the upward drawing force applied to the bait and the lateral stretching force applied to the rollers should be about equal. Should the workman observe that the sheet is not drawing to the full width, he would increase the speed at which the conical rollers are moving, or he might decrease the speed at which the bait is moved upward, this being provided for by furnishing both the rollers and the bait with driving apparatus which may be operated at varying speeds and independent of each other.

The sheet having been drawn to the desired length, it is severed at the lower end from the mass of plastic glass by reversing the direction of rotation of the rollers 12 12 and continuing the upward movement of the bait for a short distance, thereby causing the lower end of the sheet of glass to quickly draw to a cord or thread which can be easily severed, as with a cold iron, a pair of shears, or other suitable severing devices employed in the art. This mode of severing the glass from the mass of molten glass leaves the latter in perfect condition for the operation of drawing a second sheet therefrom. When the lower end of the drawn sheet is detached, it is raised high enough to clear the burners and other working parts of the apparatus and then swung outward from over the working pot and laid horizontally upon suitable supports, after which the bait is cracked off in any usual or suitable manner now known in the art, when the sheet is ready for the usual annealing process. The operation may then be repeated by attaching another bait to the drawing-cables and proceeding as before.

What is claimed is—

1. In an apparatus for drawing sheet-glass, a receptacle containing molten glass, means for drawing glass therefrom in sheet form in a longitudinal direction, and two surfaces revolving in opposite directions and engaging the molten glass in the receptacle and a face of the sheet as drawn.

2. In an apparatus for drawing sheet-glass, a receptacle containing molten glass, means for drawing glass therefrom in sheet form in a longitudinal direction, and two oppositely-revolving rollers engaging the molten glass in the receptacle and a face of the drawn sheet.

3. In an apparatus for drawing sheet-glass, a receptacle containing molten glass, means for drawing glass therefrom in sheet form in a longitudinal direction, and two oppositely-revolving conical surfaces engaging the molten glass in the receptacle and a face of the sheet as drawn.

4. In an apparatus for drawing sheet-glass, a receptacle containing molten glass, means drawing glass therefrom in sheet form in a longitudinal direction, and two conical rollers revolving in opposite directions each having a portion of their surface dipping into the mass of molten glass in said receptacle and a portion engaging the surface of the sheet as drawn, whereby said rollers serve not only to draw glass from the receptacle to form a portion of the sheet, but also to stretch said sheet laterally.

5. In an apparatus for drawing sheet-glass, a receptacle containing molten glass, means drawing glass therefrom in sheet form in a longitudinal direction, and two oppositely-revolving surfaces whose axes of rotation are inclined at an angle to the surface of the molten glass and to the surface of the drawn sheet, said revolving surfaces engaging the molten glass in the receptacle and a face of the sheet as drawn.

6. In an apparatus for drawing sheet-glass, a receptacle containing molten glass, means drawing glass therefrom in sheet form in a longitudinal direction, and two oppositely-revolving conical surfaces whose axes of rotation are inclined at an angle to the surface of the molten glass and to the surface of the drawn sheet, said revolving surfaces engaging the molten glass in the receptacle and a face of the sheet as drawn.

7. In an apparatus for drawing sheet-glass, a receptacle containing molten glass, means drawing glass therefrom in sheet form in a longitudinal direction, two oppositely-revolving surfaces whose axes of rotation are inclined at an angle to the surface of the molten glass and to the surface of the drawn sheet, said revolving surfaces engaging the molten glass in the receptacle and a face of the sheet as drawn, and devices for operating said surfaces at variable speeds.

8. In an apparatus for drawing sheet-glass, a receptacle containing molten glass, means drawing glass therefrom in sheet form in a longitudinal direction, two oppositely-revolving conical surfaces whose axes of rotation are inclined at an angle to the surface of the molten glass and to the surface of the drawn sheet, said revolving surfaces engaging the molten glass in the receptacle and a face of the sheet as drawn, and devices for operating said surfaces at variable speeds.

9. In an apparatus for drawing sheet-glass, a receptacle containing molten glass, means for drawing glass therefrom in sheet form in a longitudinal direction, two revolving surfaces turning in opposite directions and engaging the face of said sheet within said receptacle.

10. In an apparatus for drawing sheet-glass, a receptacle containing molten glass, means drawing glass therefrom in sheet form in a longitudinal direction, and two oppositely-revolving surfaces having axes of rotation inclined at an acute angle to the surface of said sheet and to the surface of the molten glass in said receptacle and each engaging a face of said sheet and the molten glass in the receptacle.

11. In an apparatus for drawing sheet-glass, a receptacle containing molten glass, means drawing glass therefrom in sheet form, and two conical surfaces each engaging a face of said sheet adjacent the surface of the molten glass, and means revolving said conical surfaces in opposite directions.

12. In an apparatus for drawing sheet-glass, a receptacle containing molten glass, means drawing glass therefrom in sheet form, two conical surfaces within said receptacle each engaging a face of said sheet adjacent to the surface of the molten glass, and means revolving said surfaces in opposite directions.

13. In an apparatus for drawing sheet-glass, a receptacle containing molten glass, means drawing glass therefrom in sheet form, two conical surfaces each engaging the face of said sheet adjacent to each edge thereof, and means revolving said surfaces in opposite directions.

14. In an apparatus for drawing sheet-glass, a receptacle containing molten glass, means for drawing glass therefrom in sheet form, two conical surfaces engaging the molten glass in said receptacle and a face of the sheet as drawn, means revolving said surfaces in opposite directions, and means cooling the sheet as drawn.

15. In an apparatus for drawing sheet-glass, a receptacle containing molten glass, means drawing glass therefrom in sheet form, two surfaces each engaging the molten glass in the receptacle and the lateral portions of the face of the sheet, means revolving said surfaces in opposite directions, and means for supplying heat to the opposite faces of the sheet during the drawing operation.

16. In an apparatus for drawing glass, a receptacle containing molten glass, a corrugated sheet-metal bait, and means for lowering said bait into said receptacle and withdrawing it therefrom.

17. In an apparatus for drawing glass, a receptacle containing molten glass, a corrugated bait, means for lowering said bait into the molten glass in said receptacle and withdrawing it therefrom, and a plurality of oppositely-revolving surfaces engaging the molten glass in said receptacle and the face of the sheet as drawn.

18. In an apparatus for drawing glass, a corrugated sheet-metal bait, a receptacle containing molten glass, and means for operating said bait.

19. In an apparatus for drawing glass, a corrugated bait, a receptacle containing molten glass, and means for operating said bait.

20. In an apparatus for drawing glass, a receptacle containing molten glass, a corrugated metallic bait, and means for operating said bait.

In testimony whereof we have signed this specification in the presence of two subscribing witnesses.

IRVING W. COLBURN.
EDGAR WASHBURN.

Witnesses:
  THOMAS McGOUGH,
  H. W. ROWLAND.